US008622743B2

(12) United States Patent
Bone et al.

(10) Patent No.: US 8,622,743 B2

(45) Date of Patent: Jan. 7, 2014

(54) WAGERING GAME TRAINING TOOL FOR WAGERING SYSTEMS

(75) Inventors: Robert Bone, Chicago, IL (US); Dean A. Ehrlich, Arlington Heights, IL (US); Allon G. Englman, Chicago, IL (US); James J. Getz, Henderson, NV (US); Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 327 days.

(21) Appl. No.: 12/945,487

(22) Filed: Nov. 12, 2010

(65) Prior Publication Data

US 2011/0118009 A1 May 19, 2011

Related U.S. Application Data

(60) Provisional application No. 61/261,021, filed on Nov. 13, 2009.

(51) Int. Cl.
*G09B 19/22* (2006.01)

(52) U.S. Cl.
USPC .................. 434/128; 463/13; 463/20; 463/23

(58) Field of Classification Search
USPC ................... 434/128, 129; 463/13, 16, 20, 23
See application file for complete search history.

(56) References Cited

U.S. PATENT DOCUMENTS

| | | | | |
|---|---|---|---|---|
| 7,559,838 | B2 | 7/2009 | Walker et al. | |
| 2004/0029087 | A1* | 2/2004 | White | 434/219 |
| 2006/0188860 | A1* | 8/2006 | Morrison | 434/322 |
| 2006/0211489 | A1 | 9/2006 | Walker et al. | |
| 2009/0176558 | A1* | 7/2009 | Englman et al. | 463/25 |
| 2009/0286583 | A1 | 11/2009 | Barney et al. | |
| 2010/0099063 | A1 | 4/2010 | Cramer et al. | |
| 2010/0120502 | A1* | 5/2010 | Oberberger | 463/20 |
| 2010/0151948 | A1* | 6/2010 | Vance et al. | 463/43 |

FOREIGN PATENT DOCUMENTS

WO WO2010002897 1/2010

OTHER PUBLICATIONS

"Video Poker for Winners", www.videopokerforwinners.com http://www.videopokerforwinners.com/ Date obtained from the internet Feb. 14, 2011 2010 , 1 page.
"Video Poker.com", www.videopoker.com http://www.videopoker.com/ Date obtained from the internet Feb. 14, 2011 2010 , 1 page.
"Zamzow Software Solutions", www.zamzone.com http://www.zamzone.com/ Date obtained from the internet Feb. 14, 2011, 2 pages.

* cited by examiner

*Primary Examiner* — Bruk Gebremichael
(74) *Attorney, Agent, or Firm* — DeLizio Gilliam, PLLC

(57) ABSTRACT

A wagering game system and its operations are described herein. In some embodiments, the operations can include initiating, at a gaming machine, an analysis mode of a wagering game training tool associated with a wagering game, and determining when a player has played a predefined number of rounds of the wagering game. The operations can also include determining a skill level associated with the player for one or more areas of skill associated with the wagering game based, at least in part, on the predefined number of rounds played by the player. The operations can further include identifying an area of skill associated with the wagering game where the skill level associated with the player is less than a predefined skill level, and initiating a training mode of the wagering game training tool to improve the skill level associated with the player in the identified area of skill.

18 Claims, 8 Drawing Sheets

WAGERING GAME TRAINING TOOL FOR WAGERING SYSTEMS

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

FIELD

Embodiments of the inventive subject matter relate generally to wagering game systems, and more particularly to a wagering game training tool for wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Traditionally, wagering game machines have been confined to physical buildings, like casinos (e.g., major casinos, road-side casinos, etc.). The casinos are located in specific geographic locations that are authorized to present wagering games to casino patrons. However, with the proliferation of interest and use of the Internet, some wagering game manufacturers have recognized that a global public network, such as the Internet, can reach to various locations of the world that have been authorized to present wagering games. Consequently, some wagering game manufacturers have created wagering games that can be processed by personal computing devices and offered via online casino websites ("online casinos").

BRIEF DESCRIPTION OF THE FIGURES

Embodiments are illustrated in the Figures of the accompanying drawings in which.

DESCRIPTION OF THE EMBODIMENTS

This description of the embodiments is divided into five sections. The first section provides an introduction to some embodiments, while the second section describes example wagering game machine architectures. The third section describes example operations performed by some embodiments and the fourth section describes example wagering game machines in more detail. The fifth section presents some general comments.

Introduction

This section provides an introduction to some embodiments.

Wagering game systems offer wagering game players ("players") entertainment value and the opportunity to win monetary value. In some embodiments, a wagering game system may offer players a wagering game training tool to improve their skill level in one or more wagering games. The wagering game system can offer the wagering game training tool via an online website (e.g., a dedicated training tool website, an online casino website, etc.), at kiosks and/or gaming machines in a casino floor, or as a downloadable client application that players can use in their personal gaming devices (e.g., personal computers and portable devices). The wagering game training tool may include an analysis mode where a player's skill level associated with a wagering game is determined. The wagering game training tool may also include a training mode where various training exercises are customized for the player, according to the results of the analysis mode, to improve the player's skill level, as will be further described below. In some embodiments, the wagering game training tool can provide training tool activity data to an online wagering game server, where the data for each player is organized and stored, e.g., in a player's wagering game account. The online wagering game server can offer the players access to their training tool activity data and other historical data via a network (e.g., the Internet). Furthermore, the online wagering game server can collect wagering game activity data associated with the wagering games that each player plays (e.g., both in brick and mortar and online casinos) and manage a gaming community results website where real-time result statistics, including wagering game leaderboards, are maintained and made available for the members of the gaming community. In some embodiments, the online wagering game server can also analyze the collected wagering game activity data and provide the analysis results to the wagering game training tool to further customize the training mode for the players. For example, the online wagering game server can determine variables in the state of play associated with the wagering games played by each player, and provide this information to the wagering game training tool to offer players customized training exercises which can simulate one or more of the identified state of play variables to improve the player's skills in a casino floor environment.

Figure 1:
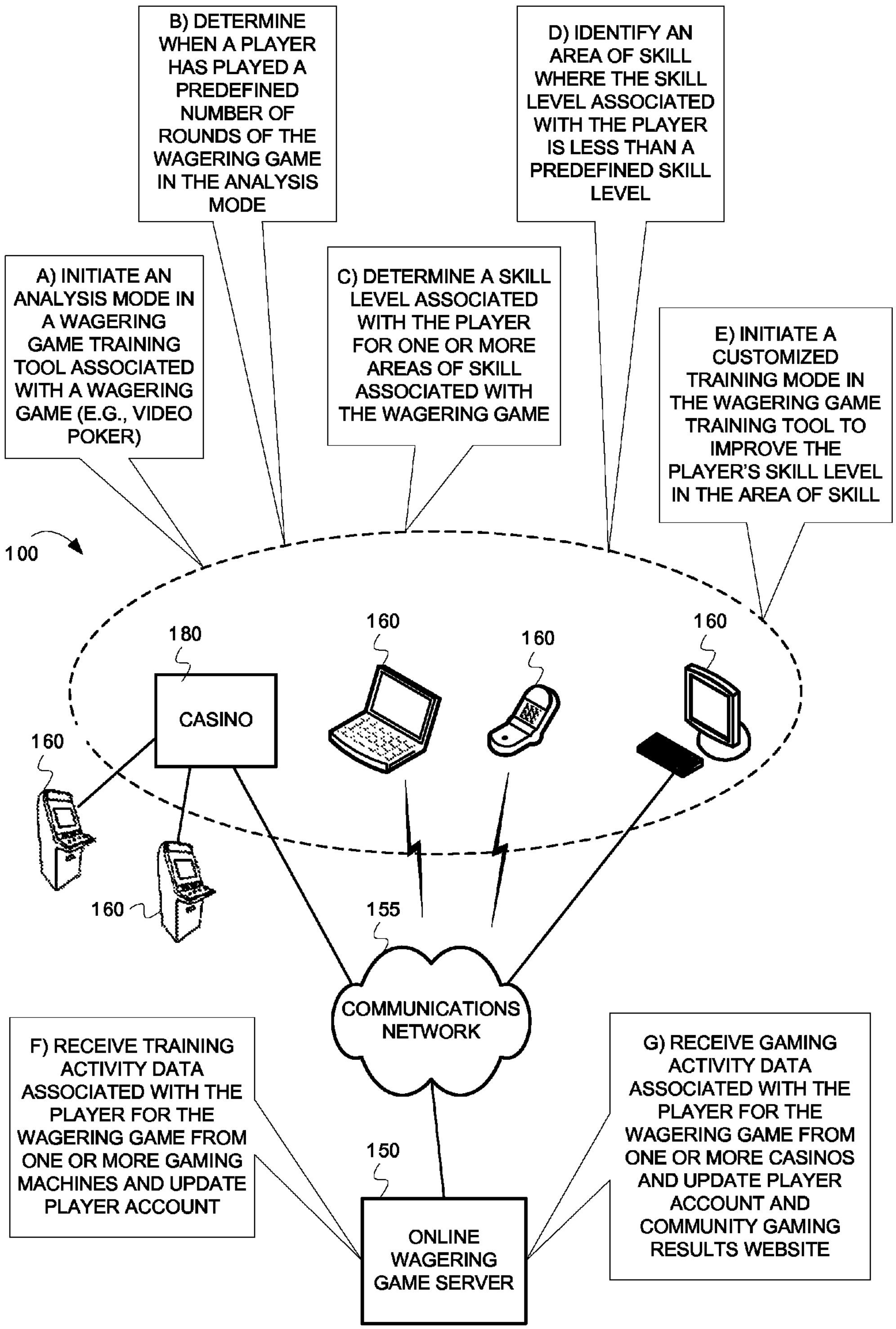
FIG. 1 is a conceptual diagram illustrating an example of a wagering game training tool in a wagering game system, according to some embodiments.

FIG. 1 is a conceptual diagram illustrating an example of a wagering game training tool in a wagering game system, according to some embodiments. In the example shown in FIG. 1, the wagering game system ("system") 100 includes an online wagering game server 150 and a plurality of gaming machines 160 connected via a communications network 155. As illustrated, the gaming machines 160 can include various electronic devices used by players to play wagering games, e.g., personal computers, laptops, mobile phones, etc. The gaming machines 160 can also include wagering game machines in a casino network 180. In some embodiments, the online wagering game server 150 can connect to the casino network 180, which may include additional casino network devices, such as wagering game servers, account servers, kiosks, or other devices (not shown).

The wagering game training tool can be implemented at the online wagering game server 150 and the player can access the wagering game training tool via the communications network 155 (e.g., the Internet) using a gaming device 160. The wagering game training tool can also be implemented in a server in a casino network 180 and accessible via a gaming machine 160 on the casino floor. The wagering game training tool can further be implemented as a downloadable client application that the player can download to a gaming machine 160, which is accessible whether the player is online or offline.

In one implementation, at stage A, the wagering game training tool initiates an analysis mode associated with a wagering game for a player. For example, the wagering game training tool can initiate an analysis mode for a video poker game. During the analysis mode, the wagering game training tool instructs the player to start playing the wagering game so that the training tool can determine the skill level of the player.

At stage B, the wagering game training tool determines when the player has played a predefined number of rounds of the wagering game. For example, the wagering game training tool determines when the player has played 100 rounds of a video poker game. It is noted, however, that the predefined number of rounds can programmable and can be any number of rounds necessary to determine the player's skill level during the analysis mode.

At stage C, the wagering game training tool determines a skill level associated with the player for one or more areas of skill associated with the wagering game based on the predefined number of rounds played by the player. For example, the wagering game training tool can determine a skill level in areas of skill such as pattern recognition (e.g., playing card pattern recognition), speed of play (e.g., number of rounds played in a given time period), game strategies (e.g., whether to double down in blackjack), etc., as will be further described below with reference to FIG. 3. For instance, in one example, to determine the player's skill level in a pattern recognition area of skill, the wagering game training tool can determine how well the player recognized certain patterns associated with the wagering game (e.g., playing card patterns in a video poker game) during the predefined number of rounds. Additionally, the wagering game training tool can track the total amount of time the player takes to complete the predefined number of rounds, and consider the total amount of time when determining the player's skill level. In some implementations, the level of skill can be represented based on a scale from 1 to 10 or from 1 to 100. The scale for the level of skill can be translated to various skill ratings, e.g., "novice", "average", "skilled", and "expert" skill levels.

At stage D, the wagering game training tool identifies an area of skill where the skill level associated with the player is less than a predefined skill level. For example, the wagering game training tool may identify an area of skill where the player's skill level is below a 6 out of 10, or below an "average" skill rating. In one implementation, the predefined skill level associated with the wagering game training tool can be configured by the player to a desired skill level, e.g., the player can set the predefined skill level to a 6 out of 10, or at an "average" skill rating. In another implementation, the wagering game training tool can automatically set the predefined skill level based on the player's skill level, e.g., if the player is determined to have an "average" skill rating, the wagering game training tool can set the predefined skill level to a "skilled" skill rating.

At stage E, the wagering game training tool initiates a training mode including training exercises customized according to the identified area of skill to improve the player's skill level. For example, the wagering game training tool can provide the player training exercises that improve the player's pattern recognition skills, e.g., playing card player recognition skills in a video poker game, or the player's speed of play. The wagering game training tool can also initiate a training mode including training exercises customized according to two or more areas of skill in which the player has a skill level that is below a predefined skill level.

At stage F, the online wagering game server 150 receives training activity data associated with the player for the wagering game from one or more gaming machines 160. In some examples, the training activity data can be data that indicates the customized training exercise created for the player during a training mode, the player's specific selections during training exercises, the player's performance during training exercise, the player's overall results in the training exercises, and other data gathered during training exercises. In some implementations, the online wagering game server 150 receives training activity data from one or more wagering game training tools of one or more gaming machines 160 which the player has used recently. For example, the player may have used a wagering game training tool at a kiosk in a casino floor, and the player may have also used a wagering game training tool on his mobile phone, e.g., in the hotel room after leaving the casino. In this example, both of these training tools can provide training activity data to the online wagering game server 150. The online wagering game server 150 can also access training activity data associated with the wagering game training tool available online (e.g., accessible via the player's wagering game account). The online wagering game server 150 can aggregate training activity data from multiple sources and store the data in the player's wagering game account, so that it is accessible by the player at any time. In some embodiments, the training activity data can be accessed by any of the training tools in the system 100 to update and further customize training exercises for the player.

At stage G, the online wagering game server 150 receives gaming activity data associated with the player for the wagering game from a casino, e.g., from a server in an online casino or a brick and mortar casino. In some examples, the gaming activity data can be data that indicates one or more of the wagering games played by the player, the player's specific selections during the wagering games, the player's performance during the wagering games, the player's overall results in the wagering games, and other game-related data. In some implementations, the online wagering game server 150 aggregates gaming activity data for the player from one or more casino networks 180 and one or more online casinos (e.g, the online casino implemented in the online wagering game server 150). The online wagering game server 150 can aggregate the gaming activity data from multiple sources and store the data in the player's wagering game account. Furthermore, the online wagering game server 150 can update a community gaming results website based on the player's results in the rounds of the wagering game, as will be further described below with reference to FIG. 6.

Although FIG. 1 describes some embodiments, the following sections describe many other features and embodiments.

Operating Environment

This section describes example operating environments and networks and presents structural aspects of some embodiments. More specifically, this section includes discussion about wagering game system architectures.

Wagering Game System Architectures

Figure 2:
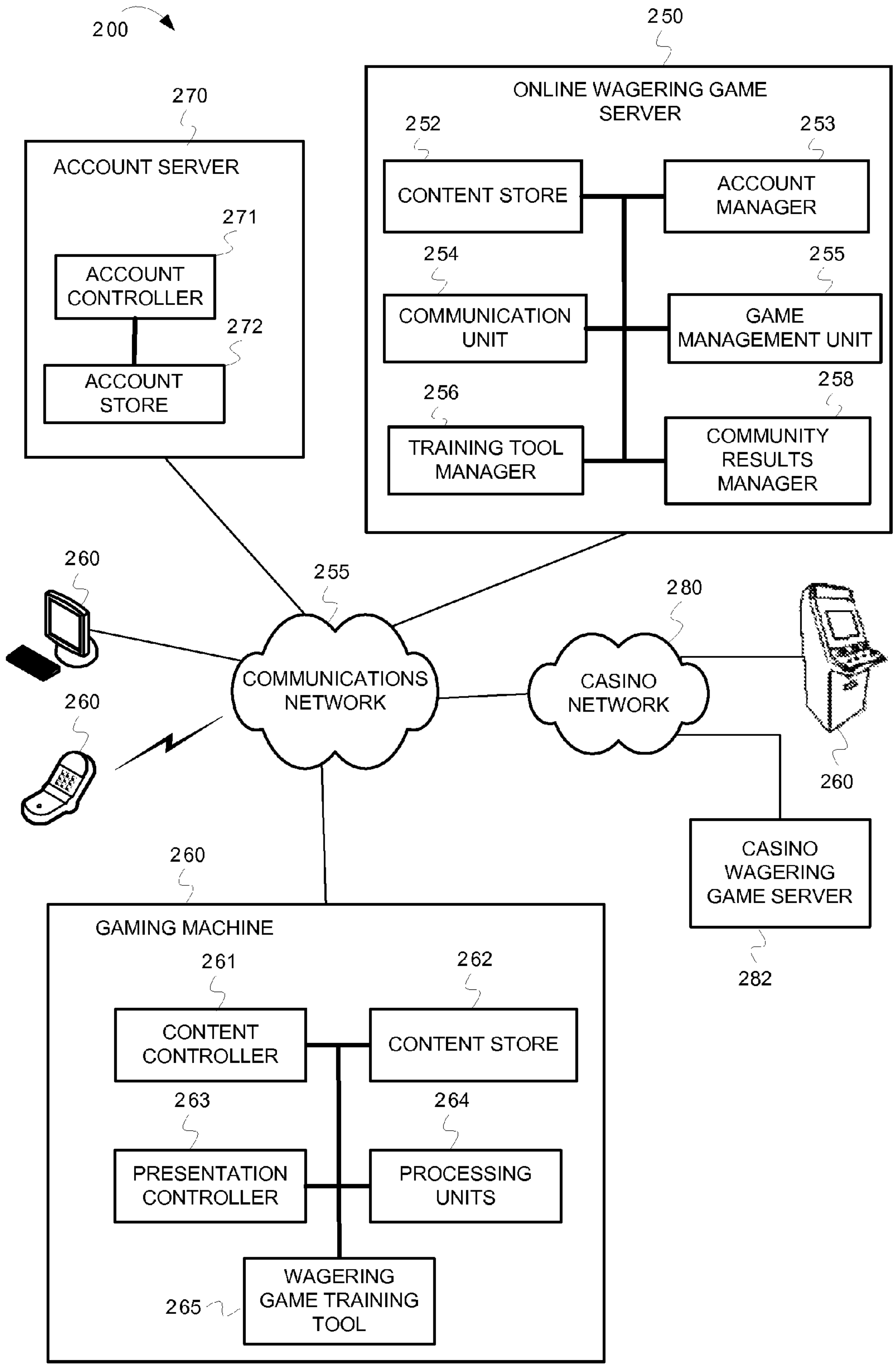
FIG. 2 is a conceptual diagram that illustrates an example of a wagering game system architecture, according to some embodiments.

FIG. 2 is a conceptual diagram that illustrates an example of a wagering game system architecture 200, according to some embodiments. The wagering game system architecture 200 can include an account server 270 configured to control player-related accounts accessible via wagering game networks. The account server 270 can manage player financial accounts (e.g., performing funds transfers, deposits, withdrawals, etc.) and player information (e.g., avatars, screen name, account identification numbers, social contacts, financial information, etc.). The account server 270 can also provide auditing capabilities, according to regulatory rules, and track the performance of players, machines, and servers. The account server 270 can include an account controller 271 configured to control information for player accounts. The account server 270 can also include an account store 272 configured to store information for the player accounts.

The wagering game system architecture 200 can include an online wagering game server 250 configured to control online wagering game content, provide wagering game results (e.g., random numbers), and communicate wagering game information, account information, and other information to and from a gaming machine 260. The online wagering game server 250 can include a content store 252 containing content for presenting game results and other events on the gaming machine 260. The online wagering game server 250 can also include an account manager 253 configured to control information related to player accounts. For example, the account manager 253 can provide wager amounts, game results amounts (e.g., win amounts), bonus game amounts, etc., to the account server 270. The online wagering game server 250 can also include a communication unit 254 configured to communicate information from the server's components to the gaming machine 260, other systems, devices, and networks (e.g., the casino network 280). For example, the communication unit 254 can exchange information with community wagering game servers, account servers, community servers, social networking servers, file sharing servers, etc.

The online wagering game server 250 may further include a wagering game management unit 255 configured to facilitate presentation of wagering games on the gaming machine 260. For example, the wagering game management unit 255 can generate and provide game results to the gaming machine 260 for presentation on a display device of the gaming machine 260. The wagering game management unit 255 can also generate random numbers and provide them to the gaming machine 260 so that the gaming machine 260 can generate game results.

The online wagering game server 250 may further include a community results manager 258 configured to aggregate gaming activity data associated with a plurality of players from one or more online casinos and one or more brick and mortar casinos. For example, the community results manager 258 can communicate with the wagering game management unit 255 to obtain gaming activity data for the online wagering games that are played by the players, and can communicate with the casino wagering game server 282 of the casino network 280 to obtain wagering game activity data for the wagering games that are played on the casino floor. In another example, the game management unit 255 can obtain the gaming activity data associated with the online wagering games and the casino network 280 and store the gaming activity data in each player's wagering game account, e.g., at the account server 270, and also provide the gaming activity data to the community results manager 258. The community results manager 258 may host a website for a gaming community that offers players an online resource for accessing their past game results and other gaming activity. The community results manager 258 may also aggregate all the gaming activity data for all the members of the gaming community and provide the gaming community an online resource to access gaming community statistics, including leaderboards for various wagering game categories. The community results manager 258 can provide awards and/or distribute promotional materials to the members of the gaming community that are at the top of the leaderboards in each of the wagering game categories.

The online wagering game server 250 may further include a training tool manager 256 configured to implement an online version of the wagering game training tool. The training tool manager 256 may also offer players the option to download a client version of the wagering game training tool for client devices. For example, players can download the client version of the wagering game training tool to their mobile devices and use the training tool on their mobile device whether they are online or offline. The training tool manager 256 can also aggregate training activity data for each player from various sources (e.g., online, client applications, casino, etc.) in order to offer players an online resource for accessing their past training tool activity. Additionally, the training tool manager 256 can provide the collected training activity data to the training tools used by the each player in the network 255 to update and further customize the training exercises presented to each player by each of the training tools.

The wagering game system architecture 200 can include a plurality of gaming machines 260 configured to communicate with the online wagering game server 250 to control and present online wagering games. For example, using a browser, each game machine 260 can present online wagering games on a display device (e.g., screen, monitor, etc.) of the game machine 260. The gaming machines 260 can be various types of systems, e.g., a personal computer (PC), a mobile device, a laptop computer, a netbook, etc. Each gaming machine 260 can include a content controller 261 configured to manage and control content and presentation of the online wagering games on the gaming machine 260. Each gaming device 260 can also include a content store 262 configured to store content to present on the gaming machine 260. Each gaming device 260 may further include a presentation controller 263 configured to control the presentation of the online wagering games on the gaming machine 260. The presentation controller 263 can include a web browser, browser plugins, and any other software and/or hardware suitable for presenting audio and video content. In some embodiments, the presentation controller 263 presents game results using content stored locally in the content store 262. However, in some instances the presentation controller 263 may receive, from the server 250, content for presenting game results, or the controller 263 may request particular content from other network devices. The gaming machine 260 can also include processing components 264 (e.g., microprocessor, memory, bus, etc.) configured to operate in concert with the gaming machine's other components. In one implementation, the processing components 264 may execute instructions associated with a wagering game training tool 265 that was downloaded from the online wagering game server 250 to initiate the training tool and allow players to use the training tool on the gaming machine 260 whether the players are online or offline.

The wagering game system architecture 200 can also include a casino network 280 comprising a casino wagering game server 282 and a plurality of gaming machines 260, e.g., wired and/or wireless casino floor wagering game machines. Similar to the online wagering game server 250, the casino wagering game server 282 can include a content store, an account manager, a communication unit, and a wagering game management unit to control wagering game content, provide wagering game results, communicate wagering game information, account information, and other information to and from the one or more casino floor gaming machines 260. The casino wagering game server 282 may also include a training tool manager configured to implement a wagering game training tool in the gaming machines 260 of the casino network 280, similar to the online implementation.

In some embodiments, each of the gaming machines 260 in the casino network 280 and the casino wagering game server 282 are configured to work together such that the gaming machine 260 can be operated as a thin, thick, or intermediate client. For example, one or more elements of game play may be controlled by the gaming machine 260 (client) or the casino wagering game server 282 (server). Game play elements can include executable game code, lookup tables, configuration files, game results, audio or visual representations of the game, game assets or the like. In a thin-client example, the casino wagering game server 282 can perform functions such as determining game results or managing assets, while the gaming machine 260 can present a audible/graphical representation of such outcome or asset modification to the players. In a thick-client example, the gaming machine 260 can determine game outcomes and communicate the outcomes to the casino wagering game server 282 for recording or managing a player's account. Similarly, in some examples, elements of the wagering game training tool implemented in the casino network 280 can be controlled by the gaming machine 260 (client) or the casino wagering game server 282 (server).

Each component shown in the wagering game system architecture 200 is shown as a separate and distinct element connected via the communications network 255. However, some functions performed by one component could be performed by other components. For example, the online wagering game server 250 can also be configured to perform functions of the account server 270. Furthermore, the components shown may all be contained in one device, but some, or all, may be included in, or performed by multiple devices, as in the configurations shown in FIG. 2 or other configurations not shown. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable storage media includes read only memory (ROM), random access memory (RAM), magnetic disk storage media, optical storage media, flash memory machines, and other types of tangible storage medium suitable for storing instructions. Machine-readable transmission media also includes any media suitable for transmitting software over a network.

Example Operations

This section describes operations associated with some embodiments. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
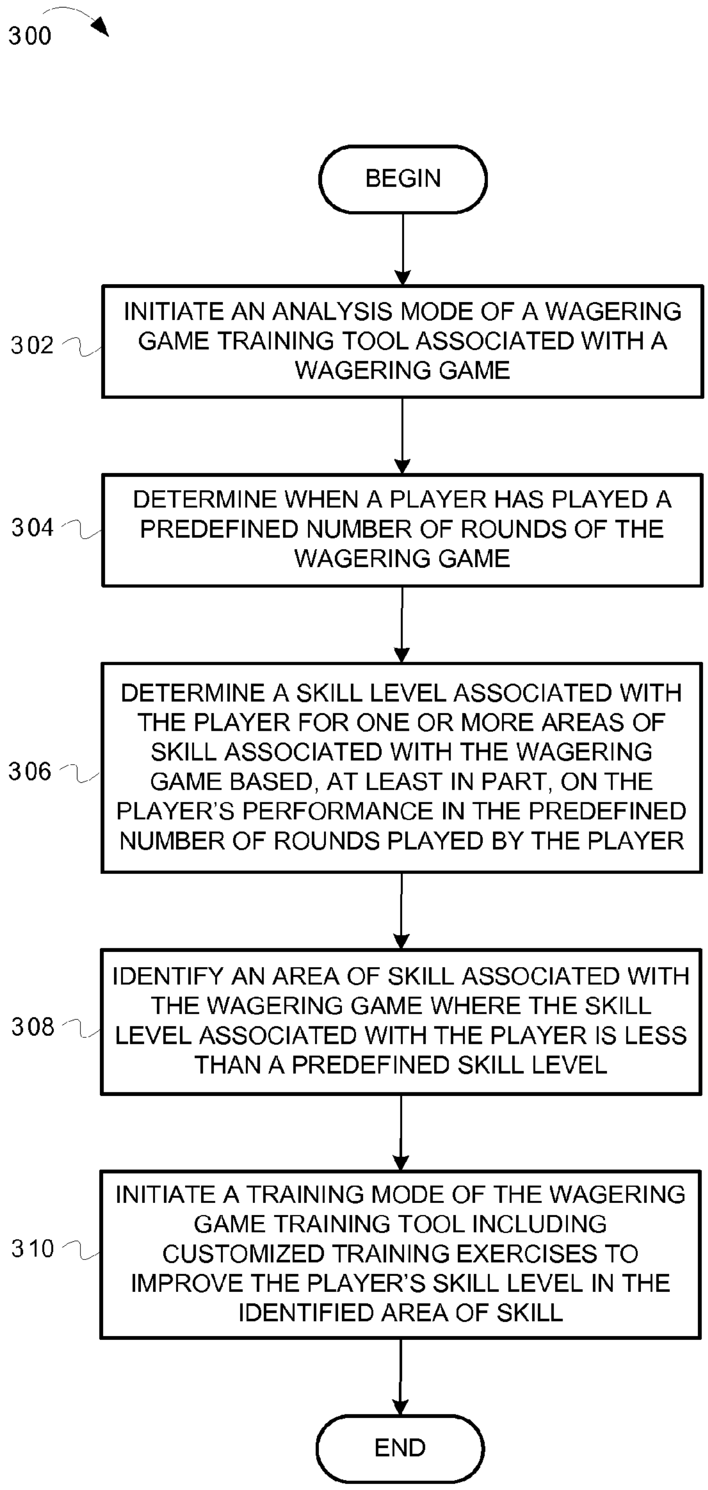
FIG. 3 is a flow diagram illustrating operations for customizing training exercises for a player to improve the player's skill level in a wagering game of a wagering game system, according to some embodiments.
Figure 4:
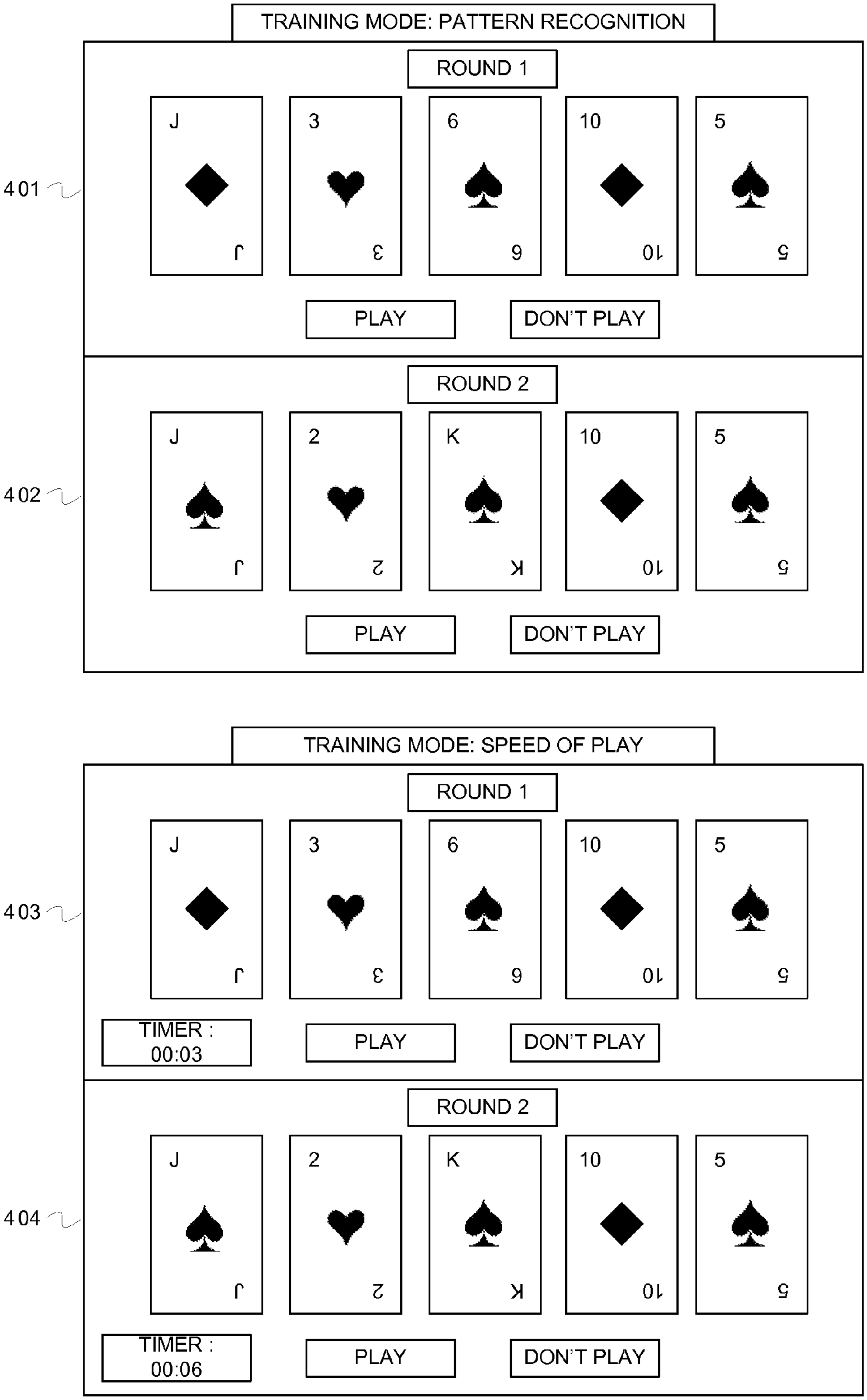
FIG. 4 is a conceptual diagram illustrating example training exercises customized based on a player's skill level, according to some embodiments.
Figure 5:
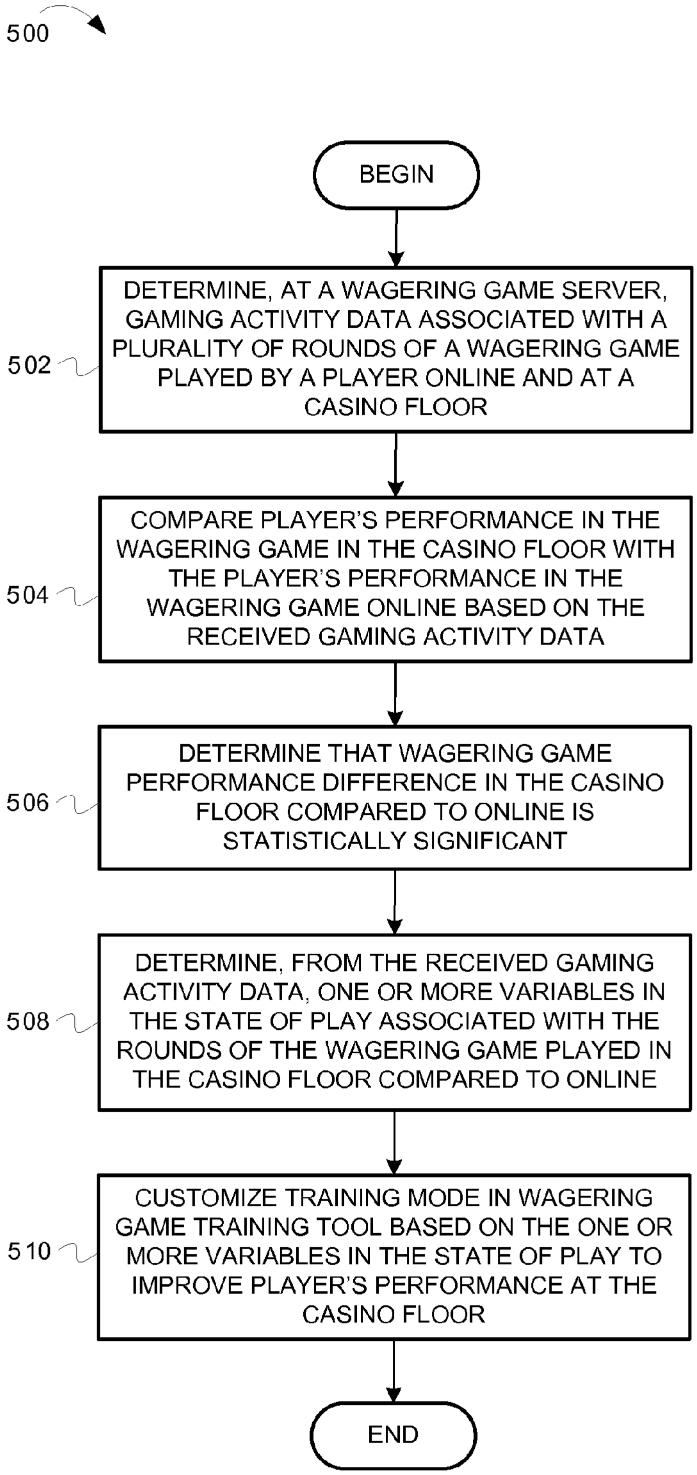
FIG. 5 is a flow diagram illustrating operations for customizing training exercises for a player to improve the player's skill level in a casino floor environment, according to some embodiments.
Figure 6:
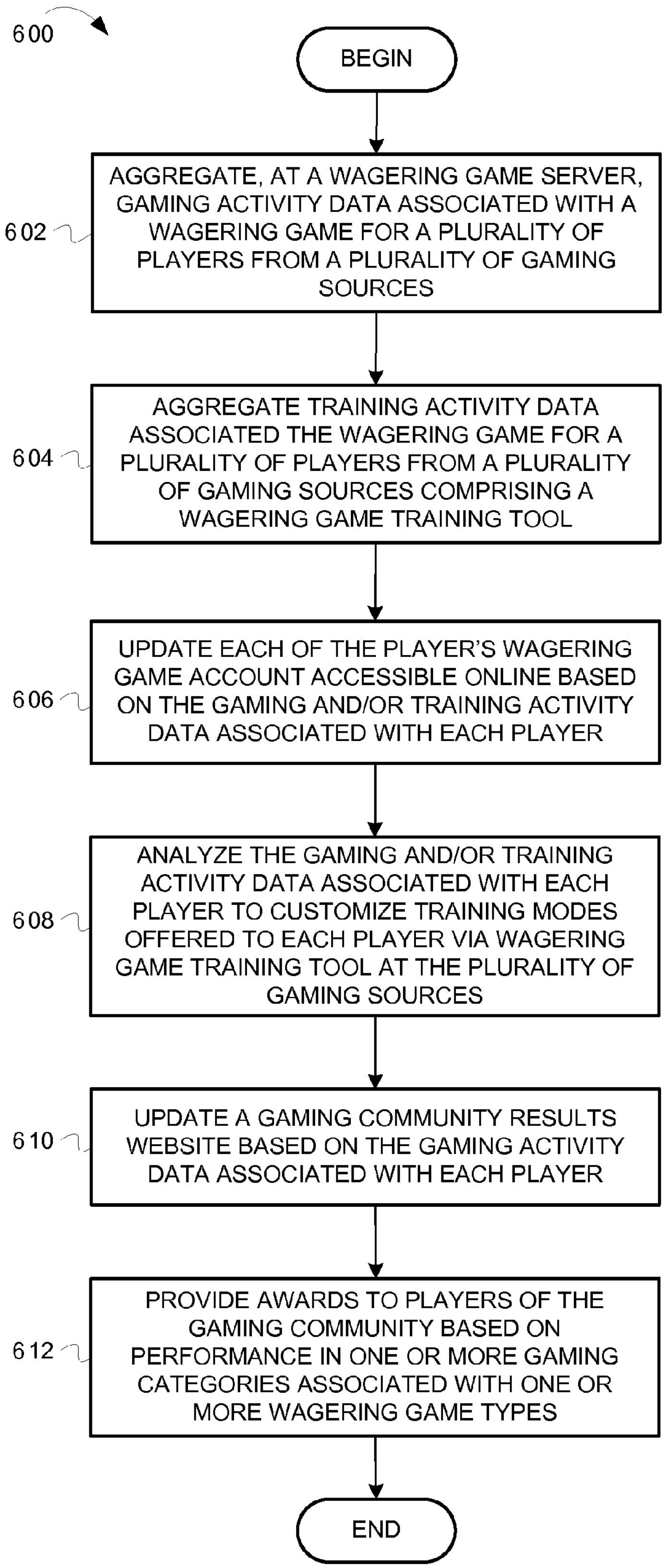
FIG. 6 is a flow diagram illustrating operations for aggregating training and gaming activity data from various gaming sources of a wagering game system for a gaming community, according to some embodiments.

The following discussion of FIGS. 3-5 describe examples of a wagering game training tool configured to customize wagering game training exercises for players in a wagering game system. FIG. 6 describes an example mechanism for aggregating training and gaming activity data from various gaming sources in a wagering game system for a gaming community.

FIG. 3 is a flow diagram ("flow") 300 illustrating operations for customizing training exercises for a player to improve the player's skill level in a wagering game of a wagering game system, according to some embodiments. The flow of 300 will be described with reference to the example system architecture of FIG. 2. The flow diagram begins at block 302.

At block 302, a gaming machine 260 initiates an analysis mode of a wagering game training tool associated with a wagering game for a player. For example, the gaming machine 260 presents the training tool on a display device of the gaming machine 260, and initiates an analysis mode of the wagering game training tool. The wagering game training tool may be available in different forms, e.g., a downloadable client version, an online version, and an in-casino version. In one implementation, the gaming machine 260 can be a client device of the network 255 (e.g., a laptop, mobile phone, etc.) that includes a downloaded client version of the wagering game training tool. In this implementation, the client device can initiate the training tool in response to receiving input from the player to run the wagering game training tool (e.g., double-clicking an icon). In another implementation, the gaming machine 260 may be a client device on the network 255 that can access an online version of the wagering game training tool managed by the online wagering game server 250. In this implementation, the client device can communicate with the online wagering game server 250 (e.g., request access to the training tool, provide log-in information, etc.) to cause the online wagering game server 250 to initiate the training tool at the gaming machine 260 (e.g., via a web browser). In a similar manner, a gaming machine 260 on the casino network 280 (e.g., a kiosk, wagering game machine, or other server-based gaming machine) can communicate with the casino wagering game server 282 to cause the server 282 to initiate an in-casino version of the wagering game training tool at the gaming machine 260. The wagering game training tool may be associated with various types of wagering games, e.g., video poker, video blackjack, etc. During the analysis mode, the wagering game training tool instructs the player to play a predefined number of rounds of the wagering game so that the training tool can gather sufficient data to determine the skill level of the player. After block 302, the flow continues at block 304.

At block 304, the wagering game training tool determines when the player has played a predefined number of rounds of the wagering game. For example, the wagering training tool can determine when the player has played 100 rounds of the wagering game, e.g., a video poker game. It is noted, however, that in some implementations the predefined number of rounds can programmable, and/or the training tool can dynamically vary the predefined number of rounds depending on whether the training tool has gathered sufficient data to determine the player's skill level. After block 304, the flow continues at block 306.

At block 306, the wagering training tool determines a skill level associated with the player for one or more areas of skill associated with the wagering game based, at least in part, on the player's performance on the predefined number of rounds of the wagering game played by the player. In some implementations, the wagering game training tool can determine a skill level in areas of skill such as pattern recognition (e.g., playing card pattern recognition), and speed of play (e.g., number of rounds played in a given time period). For instance, in one implementation, to determine the player's skill level in a pattern recognition area of skill, the wagering game training tool can determine how well the player recognized certain patterns associated with the wagering game during the predefined number of rounds. For example, in a video poker wagering game, the wagering game training tool can determine how well the player recognized playing card patterns (e.g., playing card suit/rank combinations) in the playing cards that are deal to the player during each round. In one example, the wagering game training tool can compare the player's pattern recognition performance to an optimal pattern recognition level associated with the rounds the player played. In one example, the wagering game training tool can determine whether the player recognizes certain patterns in the playing cards dealt in each round based on how the player plays each round. For instance, if three cards of the same suit are dealt in one hand, the training tool can determine whether the player recognized the pattern of a potential flush (i.e., five cards of the same suit) based on how the player plays the hand, e.g., whether the player keeps the three cards of the same suit to pursue a flush. Similarly, the training tool can determine whether the player recognizes the pattern of a potential straight, or the pattern of a two-of-a-kind. In some implementations, to determine the player's skill level in a pattern recognition area of skill, the wagering game training tool can also track the total amount of time the player takes to complete the predefined number of rounds. In other words, in addition to the player's pattern recognition performance, the wagering game training tool can consider the total amount of time when determining the player's skill level. In one example, the wagering game training tool can determine an average total amount of time that a player should take to complete the predefined number of the wagering game. In this example, the wagering game training tool can compare the actual total amount of time the player takes to complete the predefined number of rounds to the average total amount of time. In some implementations, the player's pattern recognition performance can be weighed with the player's time/speed performance to determine the player's skill level in a pattern recognition area of skill. In some cases, a player may know the rules and therefore know which is the optimal hand to hold in a given round, however, the player may miss the best hand because they did not recognize the pattern of the playing cards. Also, in some cases, although the player recognizes the patterns of the playing cards that are dealt, the player may play the predefined number of rounds too slowly (e.g., compared to an average speed) to merit an above average skill rating. It is noted, however, that in other implementations the wagering game training tool can determine the player's skill level in a pattern recognition area of skill by other techniques.

In some embodiments, the wagering game training tool can determine the player's skill level in playing the wagering game optimally, or within a predefined performance range, at a certain speed of play. The predefined performance range can be a certain percentage from optimal play, e.g., 80% or 90% from optimal play may be considered an acceptable performance range. In one example, the training tool can identify at what speed the player can play the wagering game before the players starts making too many errors, e.g., the number of errors in a predefined number of rounds is greater than a threshold. The training tool can then determine a skill level associated with speed of play based on how fast a player can play the wagering game within certain acceptable limits. For time-based wagering games, even though the player may know the rules and may play at an optimal level at a slow speed of play, the player may perform poorly if the player spends too much time in each round of a time-based wagering game.

In some implementations, the skill level of a player in a certain area of skill can be represented based on a scale from 1 to 10, or a scale from 1 to 100. In one implementation, the scale for the level of skill can be translated to various skill ratings, e.g., "novice", "average", "skilled", and "expert" skill levels. For example, in a scale from 1 to 100, a skill level of 1-30 can be considered "novice", a skill level of 31-70 can be considered "average", a skill level of 71-85 can be considered "skilled", and a skill level of 86-100 can be considered "expert". It is noted, however, that in other implementations the skill level can be determined by other techniques, e.g., the skill level can be determined on various types of point systems.

In some implementations, during the analysis mode, the wagering game training tool randomly generates the rounds of the wagering game. For example, in a video poker game, the training tool can randomly generate the playing cards that are dealt in each of the predefined number of rounds used to determine the player's skill. In other implementations, the training tool non-randomly generates the rounds of the wagering game. For example, in a video poker game, the training tool can non-randomly generate the playing cards that are dealt in each round. In other words, the training tool can non-randomly deal a certain combination of playing cards in each round to the player to purposely test the player's skill in one or more areas of skill associated with the wagering game. It is noted, however, that in some embodiments, during the analysis mode, the training tool may generate some rounds randomly and other rounds non-randomly. After block 306, the flow continues at block 308.

At block 308, the wagering game training tool identifies an area of skill associated with the wagering game where the player's skill level is less than a predefined skill level. For example, the wagering game training tool may identify an area of skill where the player's skill level is below a 6 out of 10, or below an "average" skill rating. As described above, the predefined skill level can be configured by the player, or the wagering game training tool can automatically determine the predetermined skill rating, e.g., based on the player's skill level. After block 308, the flow continues at block 310.

At block 310, the wagering game training tool initiates a training mode including training exercises customized according to the identified area of skill to improve the player's skill level. In one example, the wagering game training tool can provide the player training exercises that improve the player's pattern recognition skills. For example, to improve the player's playing card pattern recognition skills in a video poker game, the training tool may initiate a flash card mode (or visual mode), where the wagering game training tool rapidly and continuously presents hands of playing cards with a predetermined pattern to the player. The player can then provide an input that indicates whether the player detected the pattern of playing cards. During the training exercises, the training tool can non-randomly deal a certain pattern or combination of playing cards in each round to the player to purposely test the player's skill in pattern recognition. In one example, the wagering game training tool can generate the playing cards shown in rounds 401 and 402 of FIG. 4. As illustrated, in round 401, the training tool can generate a jack of diamonds, a three of hearts, a six of spades, a ten of diamonds, and a five of spades to determine whether the player recognizes a potential straight. In round 402, the training tool can generate a jack of spades, a two of hearts, a king of spades, a ten of diamonds, and a 5 of spades to determine whether the player recognizes a potential flush. In each round, the player can either select a "play" button or a "don't play" button. In this example, the player selects the "play" button when the player detects a favorable pattern of playing cards that has a great chance of winning, or selects a "don't play" button when the player does not detect a favorable pattern of playing cards. In the flash card mode, immediately after the player selects one of the buttons, the training tool presents the next hand of playing cards. In some implementations, the flash card mode may provide the player a limited amount of time to recognize the pattern and make the selection. As the player improves their pattern recognition skills, the flash card mode can reduce the amount of time the player is provided to recognize the patter and make the selection. The flash card mode can also be configured to present the player two hands of playing cards, and the player can select which of the two hands the player would hold, or which of the two hands satisfies a predetermined condition or pattern (e.g., a flush). In some implementations, the training tool can further customize training exercises to focus on a specific area of pattern recognition that the player continuously makes mistakes. For example, based on the data from the analysis mode, the training tool may determine that the player regularly misses the pattern associated with a straight or a flush. Therefore, in this example, during the training exercises, the training tool may regularly test the player with combinations of player cards that are, or have a potential of being, a straight or a flush. In one example, the flash card mode can be configured to present the player a hand of playing cards and ask a specific question about the hand, e.g., is this hand a straight or a flush?, does this hand have a potential of being a straight or a flush?, etc. The player may select either a "yes" or "no" button and move to the next hand.

Furthermore, the wagering game training tool can provide the player training exercises that improve the player's speed of play. For example, to improve the player's speed of play in a video poker game, the training tool may initiate a time-based mode, which incorporates a timer in each round of the video poker game (e.g., as illustrated in rounds 403 and 404 of FIG. 4) to limit the amount of time the player spends in each round. For example, as shown in round 403, the timer may be set at 3 seconds for a skilled player, and as shown in round 404, the timer may be set to 6 seconds for an average player. In some implementations, the player may be penalized each time the player does not finish the round within the given time. Instead of providing a timer for each round, the time-based mode may also be configured to provide players a predetermined amount of time to finish a predetermined number of rounds (e.g., finish 50 rounds in 5 minutes). The wagering game training tool can also initiate a training mode including training exercises customized according to two or more areas of skill in which the player has a skill level that is below a predefined skill level (e.g., combine pattern recognition training exercises with time-based training exercises, and/or add a timer to the pattern recognition exercises). After block 310, the flow ends.

In some embodiments, the wagering game training tool may be configured to re-evaluates the player's skill level after each session of training exercises and/or after each session where the player plays some rounds of the wagering game. In some examples, the wagering game training tool may wait to re-evaluate a player's skill level in one or more areas of skill associated with the wagering game until the player has finished a predefined number of training exercises, and/or until the player has played a predefined number of additional rounds of the wagering game. After re-evaluating the player's skill level, if the player has improved his skills, the wagering game training tool may modify the training exercises according to the player's new skill level. Also, the wagering game training tool may identify new areas of a wagering game where the player needs to improve their skills, and may customize training exercises to improve the player's skills in those areas. In other words, the training tool may continuously analyze the player's performance and skill level in a wagering game, and continuously adapt and customize training exercises to improve the player's skills in the wagering game.

It is noted that besides helping to improve a player's skill level in one or more areas of skill associated with one or more wagering games, the wagering game training tool may also teach the rules/math associated with the wagering game to achieve optimal play. For example, for a video poker wagering game, the wagering game training tool can offer various modes that teach players that holding a first combination of playing cards has a greater probability of winning than holding a second combination of playing cards. In one example, the wagering game training tool can offer players an auto hold mode where the training tool automatically holds the best hand out of the cards that were dealt for optimal play. The wagering game training tool can also offer a warn mode where the training tool alerts the player when the cards the player holds are not the optimal hand. In the warn mode, the training tool can indicate the type of error (e.g., failed to recognize a straight or flush), the severity of the error (e.g., minor or major error), and also indicate the amount of money that may be lost due to the error. The wagering game training tool can offer a casino mode that allows the player to play as many rounds of the wagering game the player wants and then at the end it shows the results and evaluates the player's performance compared to optimal play. It is noted that the wagering game training tool can offer additional training tool modes for a video poker wagering game, e.g., a fixed card mode where the player can customize the cards that are dealt, a error log mode that allows the player to access a log of all the errors the player made playing the wagering game, a payback mode that shows the player the actual payback the player would have received in a play session, among others.

FIG. 5 is a flow diagram ("flow") 500 illustrating operations for customizing training exercises for a player to improve the player's skill level in a casino floor environment, according to some embodiments. The flow of 500 will be described with reference to the example system architecture of FIG. 2. The flow diagram begins at block 502.

At block 502, the online wagering game server 250 may receive gaming activity data associated with a plurality of rounds of a wagering game played by a player online and at a casino floor. For example, the player may play the wagering game on a gaming machine of the casino network 280 (or multiple gaming machines in multiple casino networks), and the casino wagering game server 282 can provide the gaming activity data to the online wagering game server 250. The game management unit 255 can then process and/or store the gaming activity data. In some examples, the gaming activity data can be data that indicates the wagering game played by the player, the player's specific selections during each round of the wagering game, the player's performance in each round of the wagering game, the player's overall results in the wagering game, variables in the state of play associated with the rounds of the wagering game that were played, and other game-related data. The game management unit 255 can also process and store gaming activity data associated with rounds of the wagering game that the player played online (e.g., in the online casino implemented at the online wagering game server 250). After block 502, the flow continues at block 504.

At block 504, the online wagering game server 250 can access the gaming activity data associated with the player and compare the player's performance in the wagering game in the casino floor with the player's performance in the wagering game online. For example, the training tool manager 256 may read and analyze the gaming activity data to determine the player's skill in pattern recognition, the player's speed of play, the player's game strategy, the player's play in comparison to optimal play, and/or the player's overall results in the casino floor and online, and then compare the casino floor performance data to the online performance data. In other examples, the training tool manager 256 may compare the player's performance based on different or additional statistics, e.g., credits won in each round. After block 504, the flow continues at block 506.

At block 506, the online wagering game server 250 determines that the player's wagering game performance difference in the casino floor is statistically significant compared to the player's wagering game performance online. For example, the training tool manager 256 can determine that the player's wagering game performance online is better than the player's wagering game performance in the casino floor. In one implementation, the performance difference is determined to be statistically significant if the performance difference online compared to in the casino floor varies by 5%. In another implementation, the performance difference is determined to be statistically significant if the performance difference online compared to in the casino floor varies by 10%, or another suitable percentage. Similarly, in some examples the player's performance at the casino floor may be determined to be better than the player's performance online. After block 506, the flow continues at block 508.

At block 508, the online wagering game server 250 determines, based on the received gaming activity data, one or more variables in the state of play associated with the rounds of the wagering game played at the casino floor compared to online. In one implementation, the training tool manager 256 determines the one or more variables in the state of play based on the received gaming activity data. For example, the gaming activity data can indicate some variables in the state of play in the casino floor such as noise, glare, peer pressure, alcohol consumption, hunger, time of day, number of hours in casino, issues with casino gaming machine interface, etc. In some implementations, information about the variables in the state of play at a gaming machine 260 is entered by the player at the gaming machine 260 in order to be included within the gaming activity data that is generated after game play. For example, when the player logs in, or prior to each game, the gaming machine 260 may ask the player a few questions about the state of play at the gaming machine 260. In another example, the player can select certain buttons or options on the gaming machine interface to enter the state of play information. After block 508, the flow continues at block 510.

At block 510, the online wagering game server 250 customizes a training mode based on the one or more variables in the state of play to improve the player's performance at the casino floor. In one implementation, the wagering game training tool implemented by the training tool manager 256 customizes a training mode based on the one or more variables in the state of play. In some implementations, the wagering game training tool can customize training exercises which can simulate one or more of the identified state of play variables to improve the player's skills in a casino floor environment. For example, to simulate peer pressure of playing next to a friend that is a very good video poker player and/or a "high roller", the wagering game training tool can split the screen and have the computer play in one of the screens playing at an expert level and betting max bet each round. In another example, to simulate peer pressure of a group of friends gathered around the player in the casino, the wagering game training tool can add background sounds of a group of people talking and cheering for the player while the player plays the wagering game. In yet another example, the wagering game training tool can simulate the distractions of casino noise and glare by adding casino sounds and making the display less visible, respectively, while the player plays the wagering game. After block 510, the flow ends.

FIG. 6 is a flow diagram ("flow") 600 illustrating operations for aggregating training and gaming activity data from various gaming sources of a wagering game system for a gaming community, according to some embodiments. The flow of 600 will be described with reference to the example system architecture of FIG. 2. The flow diagram begins at block 602.

At block 602, the online wagering game server 250 aggregates gaming activity data associated with a wagering game for a plurality of players from a plurality of gaming sources. For example, the game management unit 255 obtains gaming activity data associated with rounds of the wagering game played by a first player in an online casino and a two different brick and mortar casinos, gaming activity data associated with rounds of the wagering game played by a second player at five different brink and mortar casinos, etc. In some examples, the gaming activity data can be data that indicates one or more of the wagering games played by the player, the player's specific selections during the wagering games, the player's performance during the wagering games, the player's overall results in the wagering games, and other game-related data. The game management unit 255 can aggregate the gaming activity data associated with each player from multiple gaming sources and store the data, e.g., in each player's wagering game account. It is noted that the online wagering game server 250 can aggregate gaming activity data associated with the plurality of players from multiple gaming sources for multiple different wagering games, e.g., video poker, video blackjack, etc. After block 602, the flow continues at block 604.

At block 604, the online wagering game server 250 aggregates training activity data associated with the wagering game for a plurality of players from a plurality of sources comprising a wagering game training tool. For example, the training tool manager 256 obtains training activity data associated with a first player from the online version of the wagering game training tool (e.g., implemented in the online wagering game server 250) and from a client version of the wagering game training tool (e.g., the training tool on the mobile phone of the first player). Also, the training tool manager 256 obtains training activity data associated with a second player from two client versions of the wagering game training tool (e.g., one training tool on the second player's mobile phone and another training tool on the second player's laptop) and from a kiosk on a casino floor (e.g., the casino network 280), etc. In some examples, the training activity data can be data that indicates the customized training exercise created for the player during a training mode, the player's specific selections during training exercises, the player's performance during training exercise, the player's overall results in the training exercises, and other data gathered during training exercises. The training tool manager 256 can aggregate training activity data associated with each player from multiple sources and store the data, e.g., in each player's wagering game account, so that it is accessible by the player at any time. It is noted that the online wagering game server 250 can aggregate training activity data associated with the plurality of players from multiple gaming sources for multiple different wagering games, e.g., video poker, video blackjack, etc. After block 604, the flow continues at block 606.

At block 606, the online wagering game server 250 updates each player's wagering game account accessible online based on the collected gaming and/or training data associated with the player. For example, the game management unit 255 can store gaming activity data associated with a first player in the first player's wagering game account, and the training tool manager 256 can store the training activity data associated with the first player in first player's wagering game account. In one example, the game management unit 255 and the training tool manager 256 can provide the gaming activity data and training activity data, respectively, to the account manager 253 for storage in the player's wagering game account in the account server 270. The online wagering game server 250 can provide access to the gaming and training activity data stored in each of the player's wagering account via a network, e.g., the Internet. For example, the player can access the wagering game account to view past wagering games the player has played, the player's past results, the player's past performance on training exercises, etc. After block 606, the flow continues at block 608.

At block 608, the online wagering game server 250 analyzes the gaming and/or training activity data associated with each player to customize training modes offered to each player via the training tool at the plurality of gaming sources. In one implementation, the training tool manager 256 accesses the gaming and training activity data associated with a player and customizes the training exercises that are offered to the player via the online version of the wagering game training tool based on the gaming and training activity data. For example, the gaming and/or training activity data may indicate that the player has improved his skills in the wagering game, and therefore the wagering game training tool can modify the training exercise according to the detected level of skill. In some implementations, besides the online wagering game training tool, the gaming and/or training activity data can be accessed by any of the wagering game training tools in the system 100 to update and further customize training exercises for the player. For example, the client version of the wagering game training tool on a player's mobile phone can access the training and/or gaming activity data in the player's wagering game account to update and further customize the training exercises offered to the player when the player uses the client online or offline. After block 608, the flow continues at block 610.

At block 610, the online wagering game server 250 updates a gaming community results website based on the gaming activity data associated with each player. In some implementations, the community results manager 258 maintains the gaming community results website to offer additional entertainment, competition, and awards to the members of the gaming community. The community results manager 258 can maintain leaderboards for different gaming categories for different wagering game types (e.g., poker, blackjack, roulette, etc.) in the gaming community results website. For example, the gaming community results can include leaderboards for the highest amount of money/credits won in each wagering game type, the greatest number of wins in each wagering game type, the highest percentage of wins for each wagering game type, the highest amount of money/credits won per round played, etc. The gaming community results website can also include leaderboards for categories associated with a particular wagering game type, e.g., in video poker, a leaderboard for the most royal flushes and a leaderboard for the most four-of-a-kind. The community results manager 258 can manage leaderboards that highlight leaders for a particular gaming category of wagering game type across the whole wagering game system 100, i.e., whether they have played the wagering game in the casino floor or online. The community results manager 258 may also maintain separate leaderboards that are specific for online wagering games, and separate leaderboards that are specific for casino floor wagering games. In some embodiments, the community results manager 258 can offer tournaments and other special events for members of the gaming community. After block 610, the flow continues at block 612.

At block 612, the online wagering game server 250 provides awards to players of the gaming community based on performance in one or more gaming categories associated with one or more wagering game types. For example, the community results manager 258 can provide monetary awards to the players at the top of each leaderboard, e.g., the top three players in each leaderboard of a gaming category. The amount of the award and the number of players awarded in each category can vary for each leaderboard. In one implementation, the community results manager 258 determines the players that are eligible to receive an award, and then communicates with the account manager 253 to credit the player's wagering game account at the account server 270 with the monetary award. In some embodiments, the community results manager 258 can provide other types of awards, instead of monetary awards, to the players. For example, the community results manager 258 can provide prizes, such as gift cards, hotel stays, flight vouchers, merchandise, etc. In another example, the community results manager 258 can award secondary economy awards, e.g., trophies, medals, special avatars, etc. that can be associated with the player in the gaming community website, e.g., displayed in the player's profile. The community results manager 258 may also award secondary economy credits which can be redeemable for merchandise, hotel stays, restaurant dinners, etc. After block 612, the flow ends.

Additional Example Operating Environments

This section describes example operating environments, systems and networks, and presents structural aspects of some embodiments.

Wagering Game Machine Architecture

Figure 7:
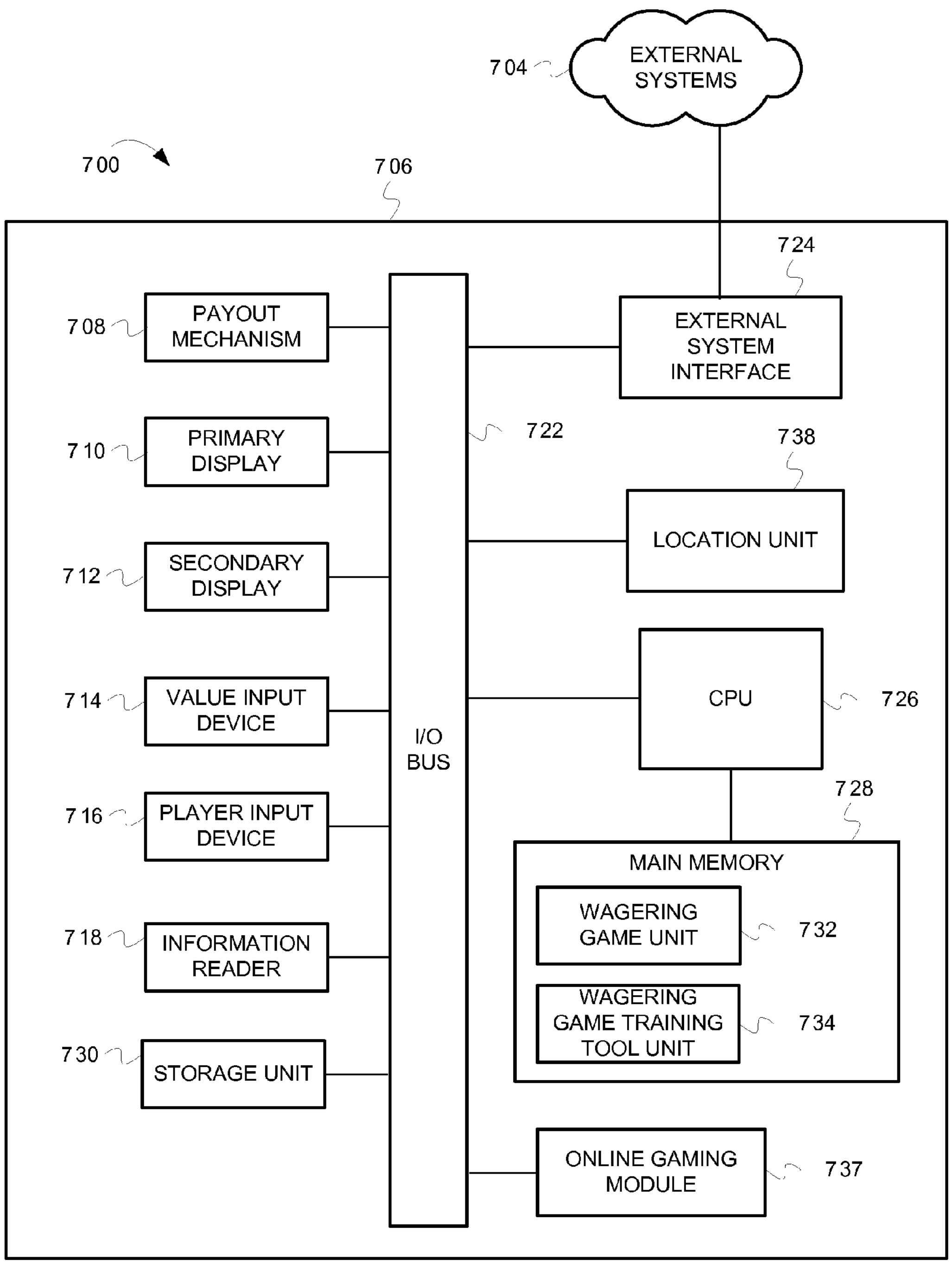
FIG. 7 is a conceptual diagram that illustrates an example of a wagering game machine architecture, according to some embodiments.

FIG. 7 is a conceptual diagram that illustrates an example of a wagering game machine architecture 700, according to some embodiments. In FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732 and a wagering game training tool unit 734. In some embodiments, the wagering game unit 732 can present wagering games, such as video poker, video black jack, video slots, video lottery, reel slots, etc., in whole or part, and detect and report wagering game activity. The wagering game training tool unit 734 may implement a wagering game training tool at the wagering game machine 700, or can facilitate the presentation of a wagering game training tool implemented on the wagering game server (e.g., server 250 or 282), e.g., as described above with reference to FIGS. 1-6.

The CPU 726 is also connected to an input/output ("I/O") bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems 704 (e.g., wagering game networks). The external system interface 724 can include logic for exchanging information over wired and wireless networks (e.g., 802.11g transceiver, Bluetooth transceiver, Ethernet transceiver, etc.)

The I/O bus 722 is also connected to a location unit 738. The location unit 738 can create player information that indicates the wagering game machine's location/movements in a casino. In some embodiments, the location unit 738 includes a global positioning system (GPS) receiver that can determine the wagering game machine's location using GPS satellites. In other embodiments, the location unit 738 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 7, in some embodiments, the location unit 738 is not connected to the I/O bus 722.

In some embodiments, the wagering game machine 706 can include additional peripheral devices and/or more than one of each component shown in FIG. 7. For example, in some embodiments, the wagering game machine 706 can include multiple external system interfaces 724 and/or multiple CPUs 726. In some embodiments, any of the components can be integrated or subdivided.

In some embodiments, the wagering game machine 706 includes an online gaming module 737. The online gaming module 737 can process communications, commands, or other information, where the processing can control and present online wagering games. In some embodiments, the online gaming module 737 can work in concert with the wagering game unit 732, and can perform any of the operations described above.

Furthermore, any component of the wagering game machine 706 can include hardware, firmware, and/or machine-readable media including instructions for performing the operations described herein.

Example Wagering Game Machines

Figure 8:
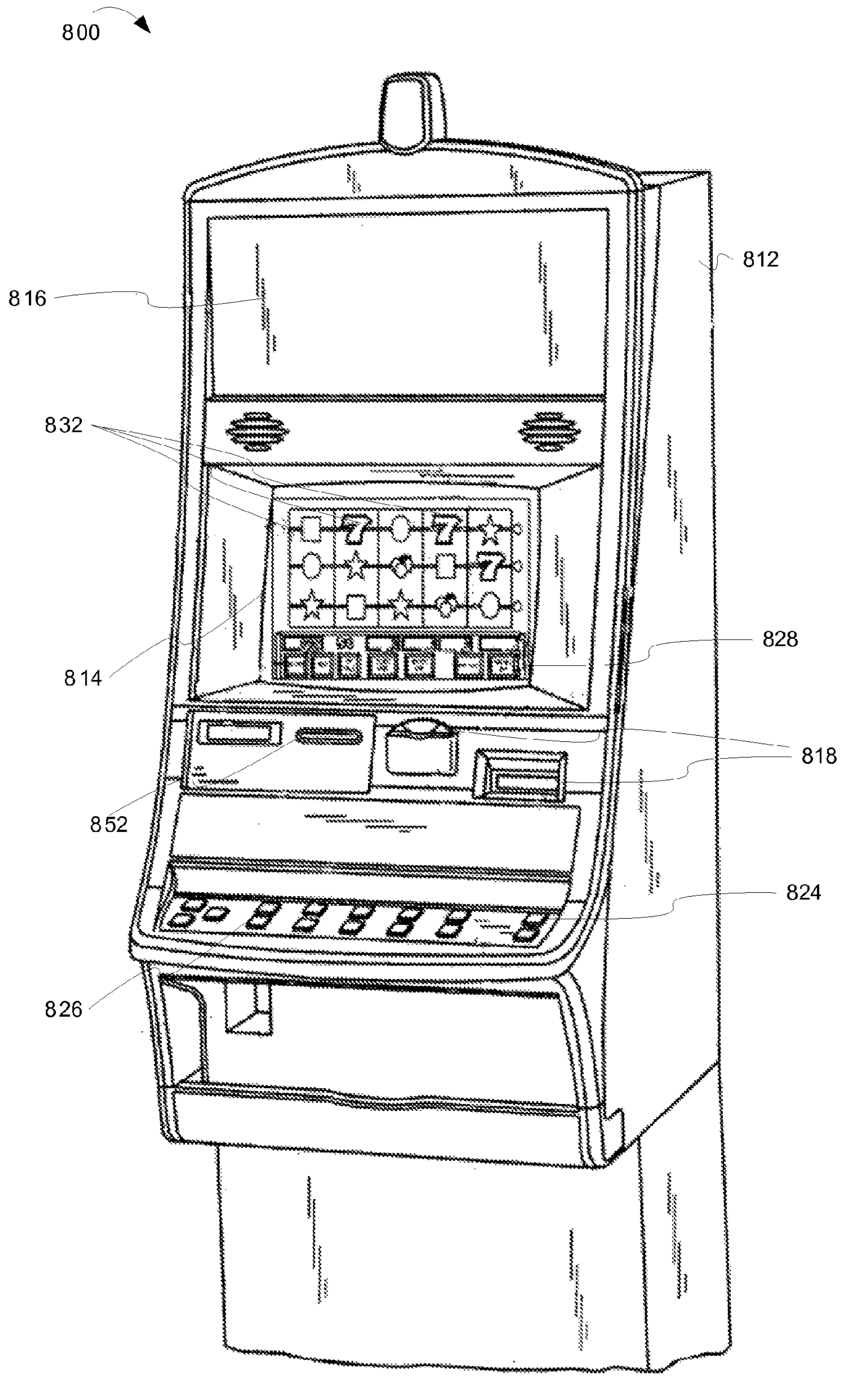
FIG. 8 is a perspective view of a wagering game machine, according to example embodiments.

FIG. 8 is a perspective view of a wagering game machine, according to example embodiments. Referring to FIG. 8, a wagering game machine 800 is used in gaming establishments, such as casinos. In some embodiments, the wagering game machine 800 can implement the functionality described above in FIGS. 1-6 for implementing a wagering game training tool in a wagering game system.

According to embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. In some implementations, the primary display 814 can also display information about a bonus wagering game and a progressive wagering game. The wagering game machine 800 also includes a secondary display 816 for displaying bonus wagering games, wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing

812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bartop model, mobile handheld model, or workstation console model.

A player begins playing a basic wagering game by making a wager via the value input device 818. The player can initiate play by using the player input device's buttons or touch screen 828. The basic game can include arranging a plurality of symbols along a payline 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer-implemented method comprising:

initiating, by a gaming machine, a computerized analysis mode of a wagering game training tool associated with a wagering game, wherein the wagering game training tool is executed on the gaming machine;

determining when a player has played a predefined number of rounds of the wagering game in the computerized analysis mode of the wagering game training tool;

determining a skill level associated with the player for one or more areas of skill associated with the wagering game based, at least in part, on the predefined number of rounds played by the player, wherein the wagering game training tool dynamically varies the predefined number of rounds of the wagering game depending on whether the wagering game training tool has gathered sufficient data to determine the player's skill;

identifying an area of skill associated with the wagering game where the skill level associated with the player is less than a predefined skill level; and initiating a training mode of the wagering game training tool to improve the skill level associated with the player in the identified area of skill, wherein the wagering game training tool teaches the player rules associated with the wagering game to achieve optimal play, and wherein the wagering game training tool further indicates type of error and severity of error corresponding to the player's performance.

2. The method of claim 1, wherein said initiating a training mode of the wagering game training tool comprises:

customizing training exercises according to the identified area of skill where the skill level associated with the player is less than the predefined skill level; and initiating, at the gaming machine, the training exercises customized according to the identified area of skill to improve the skill level associated with the player in the identified area of skill.

3. The method of claim 2, further comprising:

determining an updated skill level associated with the player for one or more areas of skill associated with the wagering game; and modifying the training exercises according to the updated skill level associated with the player for the one or more areas of skill associated with the wagering game.

4. The method of claim 1, further comprising:

receiving an input from the player at the wagering game training tool indicating a desired skill level for the player; and configuring the predefined skill level associated with the wagering game training tool for the player according to the desired skill level indicated by the player.

5. The method of claim 1, further comprising automatically determining the predefined skill level associated with the wagering game training tool for the player based on the skill level associated with the player.

6. The method of claim 1, wherein the wagering game training tool comprises analysis and training modes for a video poker wagering game, wherein said determining the skill level associated with the player for one or more areas of skill associated with the wagering game comprises determining the skill level associated with the player for at least one of a pattern recognition skill and a speed of play skill associated with the video poker wagering game.

7. The method of claim 6, further comprising determining an amount of time the player takes to complete the predefined number of rounds of the wagering game, wherein said determining the skill level associated with the player for a pattern recognition skill associated with the wagering game comprises determining the skill level associated with the player for a pattern recognition skill based, at least in part, on the player's pattern recognition performance and the amount of time the player takes to complete the predefined number of rounds of the wagering game.

8. The method of claim 7, wherein said determining the skill level associated with the player for a speed of play skill associated with the video poker wagering game comprises determining the skill level associated with the player for a speed of play skill based, at least in part, on the amount of time the player takes to complete the predefined number of rounds of the wagering game and the player's performance in the predefined number of rounds compared to an optimal play level.

9. The method of claim 1, wherein said initiating a training mode of the wagering game training tool comprises initiating a visual training mode of the wagering game training tool for a video poker wagering game if the identified area of skill is a playing card pattern recognition skill, wherein said initiating a visual training mode of the wagering game training tool comprises:

non-randomly determining a plurality of combinations of playing cards having a predetermined pattern to improve the player's pattern recognition skill during the visual training mode, wherein the predetermined pattern of one combination of playing cards is different than the predetermined pattern of another combination of playing cards;

presenting each of the plurality of combinations of playing cards having the predetermined pattern to the player during a plurality of rounds of the visual training mode;

receiving an input from the player in each of the rounds of the visual training mode that is indicative of whether the player recognized the predetermined pattern of each presented combination of playing cards; and presenting results of the visual training mode to the player.

10. The method of claim 1, wherein said initiating, by a gaming machine, a computerized analysis mode of a wagering game training tool associated with a wagering game comprises one of initiating a client version of the wagering game training tool at the gaming machine, initiating an online version of the wagering game training tool at the gaming machine via a public network, and initiating an in-casino version of the wagering game training tool at the gaming machine via a casino network.

11. The method of claim 1, wherein said determining a skill level associated with the player for one or more areas of skill associated with the wagering game comprises determining the player's skill level according to one of a predefined scale, predefined skill rating levels, and a predefined point system.

12. A wagering game machine comprising:

a processor; a network interface coupled to the processor; and a wagering game training tool unit configured to initiate an analysis mode of a wagering game training tool associated with a wagering game, and configured to:

determine when a player has played a predefined number of rounds of the wagering game in the analysis mode of the wagering game training tool;

determine a skill level associated with the player for one or more areas of skill associated with the wagering game based, at least in part, on the predefined number of rounds played by the player, wherein the wagering game training tool dynamically varies the predefined number of rounds of the wagering game depending on whether the wagering game training tool has gathered sufficient data to determine the player's skill;

identify an area of skill associated with the wagering game where the skill level associated with the player is less than a predefined skill level; and initiate a training mode of the wagering game training tool to improve the skill level associated with the player in the identified area of skill, wherein the wagering game training tool teaches the player rules associated with the wagering game to achieve optimal play, and wherein the wagering game training tool further indicates type of error and severity of error corresponding to the player's performance.

13. The wagering game machine of claim 12, wherein the wagering game training tool unit is further configured to:

customize training exercises according to the identified area of skill where the skill level associated with the player is less than the predefined skill level; and initiate the training exercises customized according to the identified area of skill to improve the skill level associated with the player in the identified area of skill.

14. The wagering game machine of claim 13, wherein the wagering game training tool unit is further configured to:

determine an updated skill level associated with the player for one or more areas of skill associated with the wagering game; and modify the training exercises according to the updated skill level associated with the player for the one or more areas of skill associated with the wagering game.

15. One or more non-transitory machine-readable storage media, having instructions stored therein, which, when executed by one or more processors causes the one or more processors to perform operations that comprise:

initiating an analysis mode of a wagering game training tool associated with a wagering game;

determining when a player has played a predefined number of rounds of the wagering game in the analysis mode of the wagering game training tool;

determining a skill level associated with the player for one or more areas of skill associated with the wagering game based, at least in part, on the predefined number of rounds played by the player, wherein the wagering game training tool dynamically varies the predefined number of rounds of the wagering game depending on whether the wagering game training tool has gathered sufficient data to determine the player's skill; and initiating a training mode of the wagering game training tool customized according to the skill level associated with the player for one or more areas of skill associated with the wagering game to improve the player's skill level in the wagering game, wherein the wagering game training tool teaches the player rules associated with the wagering game to achieve optimal play, and wherein the wagering game training tool further indicates type of error and severity of error corresponding to the player's performance.

16. The non-transitory machine-readable storage media of claim 15, wherein said operations of initiating a training mode of the wagering game training tool comprise:

identifying an area of skill associated with the wagering game where the skill level associated with the player is less than a predefined skill level; and initiating the training mode of the wagering game training tool customized according to the skill level associated with the player in the identified area of skill associated with the wagering game.

17. The non-transitory machine-readable storage media of claim 16, wherein said operations of initiating a training mode of the wagering game training tool further comprise:

customizing training exercises according to the identified area of skill where the skill level associated with the player is less than the predefined skill level; and initiating the training exercises customized according to the identified area of skill to improve the skill level associated with the player in the identified area of skill.

18. The non-transitory machine-readable storage media of claim 17, wherein the operations further comprise:

determining an updated skill level associated with the player for one or more areas of skill associated with the wagering game; and modifying the training exercises according to the updated skill level associated with the player for the one or more areas of skill associated with the wagering game.

* * * * *